US006862178B2

(12) United States Patent
Liao

(10) Patent No.: US 6,862,178 B2
(45) Date of Patent: Mar. 1, 2005

(54) HARD DISK LATCH STRUCTURE

(75) Inventor: Fang-Yang Liao, Taipei (TW)

(73) Assignee: Tatung Co., Ltd., Taipei (TW)

( * ) Notice: Subject to any disclaimer, the term of this patent is extended or adjusted under 35 U.S.C. 154(b) by 7 days.

(21) Appl. No.: 10/656,291

(22) Filed: Sep. 8, 2003

(65) Prior Publication Data

US 2004/0240171 A1 Dec. 2, 2004

(30) Foreign Application Priority Data

May 30, 2003 (TW) ........................................ 92209998 U

(51) Int. Cl.[7] .............................................. G06F 1/16
(52) U.S. Cl. ........................ 361/685; 361/726; 361/727
(58) Field of Search .......................... 248/346.03, 27.1, 248/638; 361/727, 686, 685, 726; 312/332.1, 333; 360/137

(56) References Cited

U.S. PATENT DOCUMENTS

| | | | |
|---|---|---|---|
| 6,351,376 B1 * | 2/2002 | Liang et al. ................ | 361/685 |
| 6,377,449 B1 * | 4/2002 | Liao et al. .................. | 361/685 |
| 6,721,177 B1 * | 4/2004 | Wang et al. ................ | 361/685 |
| 6,795,309 B2 * | 9/2004 | Hartung et al. ............. | 361/685 |

* cited by examiner

Primary Examiner—Lynn Feild
Assistant Examiner—Zachary Pape
(74) Attorney, Agent, or Firm—Bacon & Thomas PLLC

(57) ABSTRACT

A hard disk latch structure includes a hard disk base frame on which at least two receiving plates are formed. The receiving plates, each having a sliding groove with an insertion end and a blocking end, define a hard disk receptacle there between. The sliding grooves receive screws mounted on two lateral surfaces of a hard disk. As a hard disk is mounted between the receiving plates, a mounting element is further attached to one side of the hard disk base frame so that a plurality of blocking objects formed thereon lock those screws at the blocking ends, completing the assembly of the hard disk latch structure. The hard disk latch structure can be hook-mounted onto a computer chassis straightforwardly, which saves time and enhances efficiency of computer maintenance.

5 Claims, 6 Drawing Sheets

HARD DISK LATCH STRUCTURE

FIELD OF THE INVENTION

The present invention relates to a hard disk latch structure, and particularly to a hard disk latch structure that is easy to install in or remove from a computer chassis.

BACKGROUND OF THE INVENTION

Following the development of information technology, personal computers have become a standard home appliance. More and more people have the ability to maintain and upgrade computer hardware.

Magnetic hard disk, which is a data storage device used with computers, have constantly multiplied the storage capacity in response to the growing size of single computer files. To handle large amounts of data storage, adding a plurality of hard disks to a computer is a common measure.

However, the conventional means for mounting a plurality of hard disks onto a computer chassis uses screws, which needs tools and is time consuming.

SUMMARY OF THE INVENTION

Accordingly, the primary object of the present invention is to provide a hard disk latch structure that simplifies the operational procedures of installing or removing a hard disk, enhancing the efficiency of computer maintenance.

To achieve above objects, the present invention provides a hard disk latch structure comprising a hard disk base frame, a hard disk and a mounting element. The hard disk base frame is generally U-shaped in lateral cross-section and includes a first sidewall, a second sidewall and a top wall. The first sidewall has a first sliding mechanism, a first locking mechanism and a first assembling mechanism. On the top wall of the hard disk base frame, adjacent to both the first sidewall and the second sidewall, at least two receiving plate is integrally formed respectively. The space between the receiving plates defines a hard disk receptacle. Each of the receiving plates includes a sliding groove and an outer sliding surface; each sliding groove is composed of an insertion end and a blocking end.

A hard disk is received within the hard disk receptacle and has at least one screw mounted on each sidewall thereof. Each of the screws is respectively corresponding to one the sliding groove and is capable of sliding from the insertion end to the blocking end.

A mounting element is corresponding to an outer surface of the first sidewall of the hard disk base frame. The mounting element including a second sliding mechanism, at least one blocking object, a handling portion and a second assembling mechanism. The second assembling mechanism corresponding to the first assembling mechanism and being capable of sliding thereon. The second sliding mechanism is corresponding to the first sliding mechanism of the first sidewall and is capable of sliding thereon. The at least one blocking object supports the outer sliding surface of the at least two receiving plate adjacent to the first sidewall, the handling portion is composed of a resilient part and a handle. A second locking mechanism is formed on a corresponding surface of the resilient part facing to the first sidewall. The handle is pulled to facilitate a sliding motion between the mounting element and the hard disk base frame. The at least one blocking object thereby is urged to slide along one of the receiving plates to lock the screws attached to the hard disk at the blocking ends of the sliding grooves. The second locking mechanism accordingly is resiliently ejected into the first locking mechanism.

To mount a hard disk within the hard disk receptacle on the hard disk base frame, the hard disk is firstly aligned to the receiving plates so that each of the screws thereon respectively corresponds to an insertion end of each of the receiving plates. The hard disk is then inserted into the hard disk receptacle, and at the same time the screws slide along the sliding grooves to the blocking ends thereof. The handle of the handling portion is held to slide the mounting element along the first sidewall of the hard disk base frame so as to urge each of the blocking objects slide on the outer sliding surface of the corresponding receiving plate, and then the blocking objects lock the screws attached on the hard disk at the blocking ends of the sliding grooves.

The above-described hard disk latch structure provides a hard disk latch structure that can be easily installed within or removed from the chassis of a computer. Therefore, it has the advantage of saving operation and maintenance time for disk installing and removing.

The various objects and advantages of the present invention will be more readily understood from the following detailed description when read in conjunction with the appended drawing.

BRIEF DESCRIPTION OF THE PREFERRED EMBODIMENT

Figure 1:
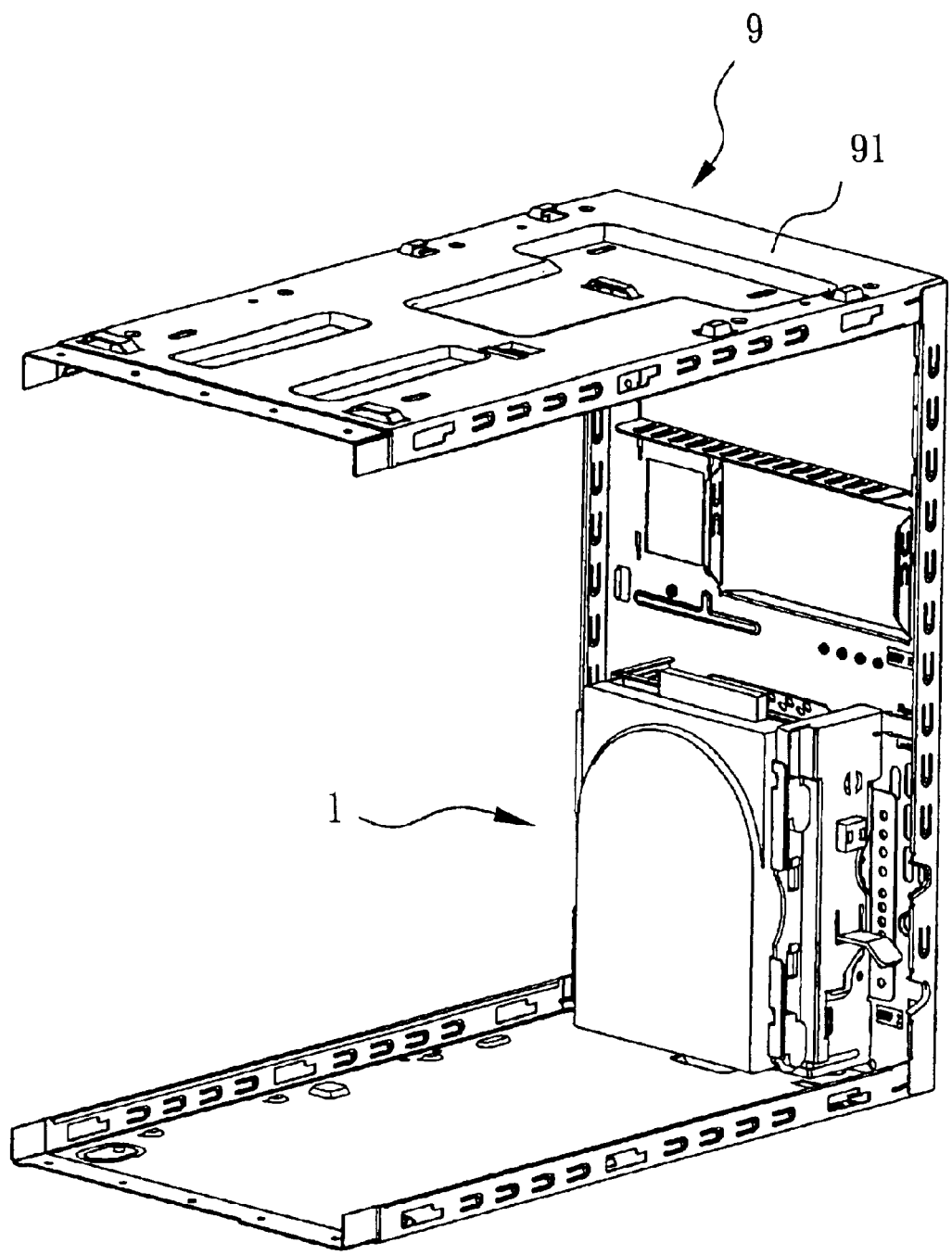
FIG. 1 is a perspective view of the present invention being mounted within a computer chassis.

Referring to FIG. 1, a preferred embodiment of the present invention as a hard disk latch structure 1 is disposed within the chassis 91 of a computer 9.

Figure 2:
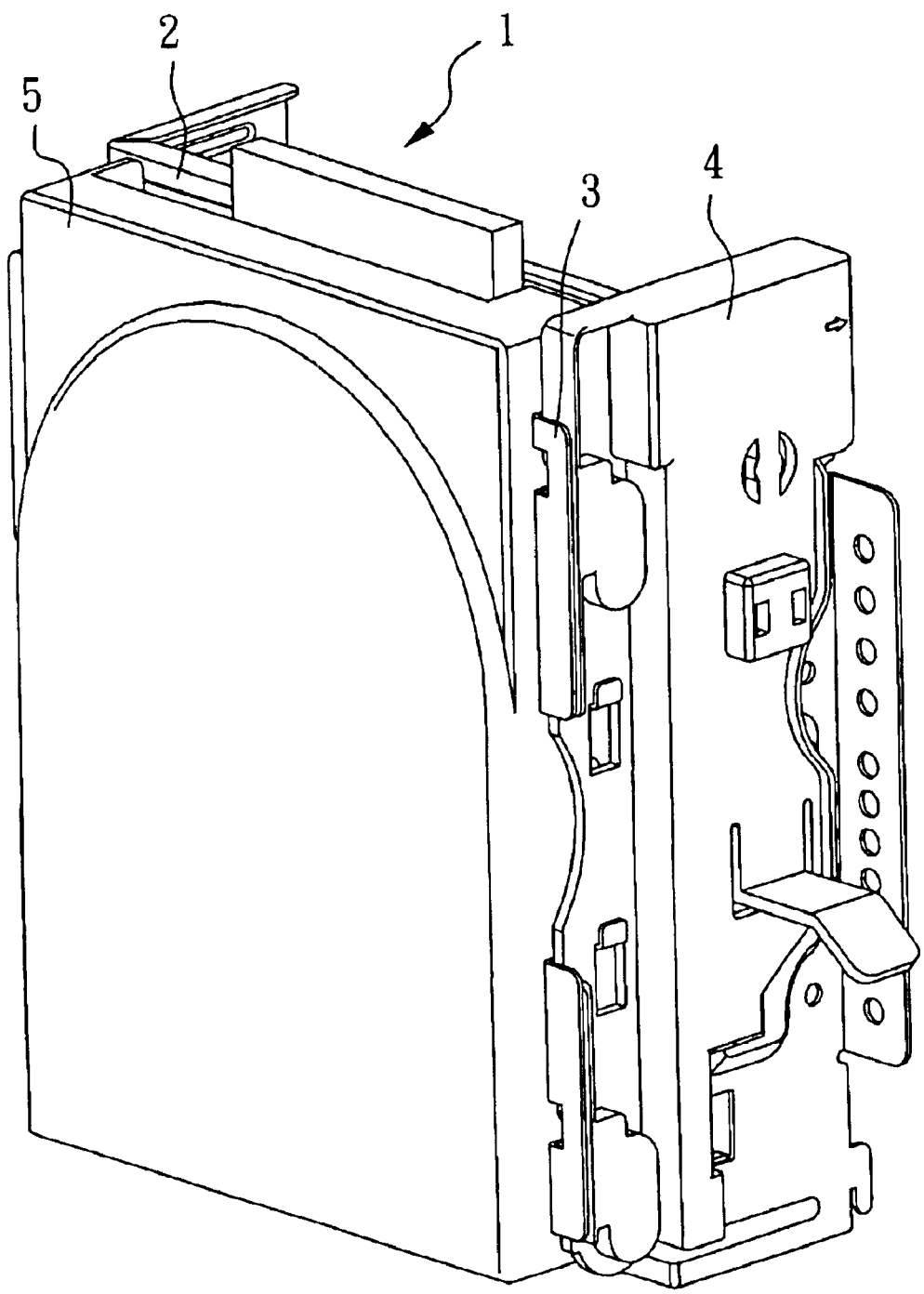
FIG. 2 is a perspective view of the present invention.
Figure 3A:
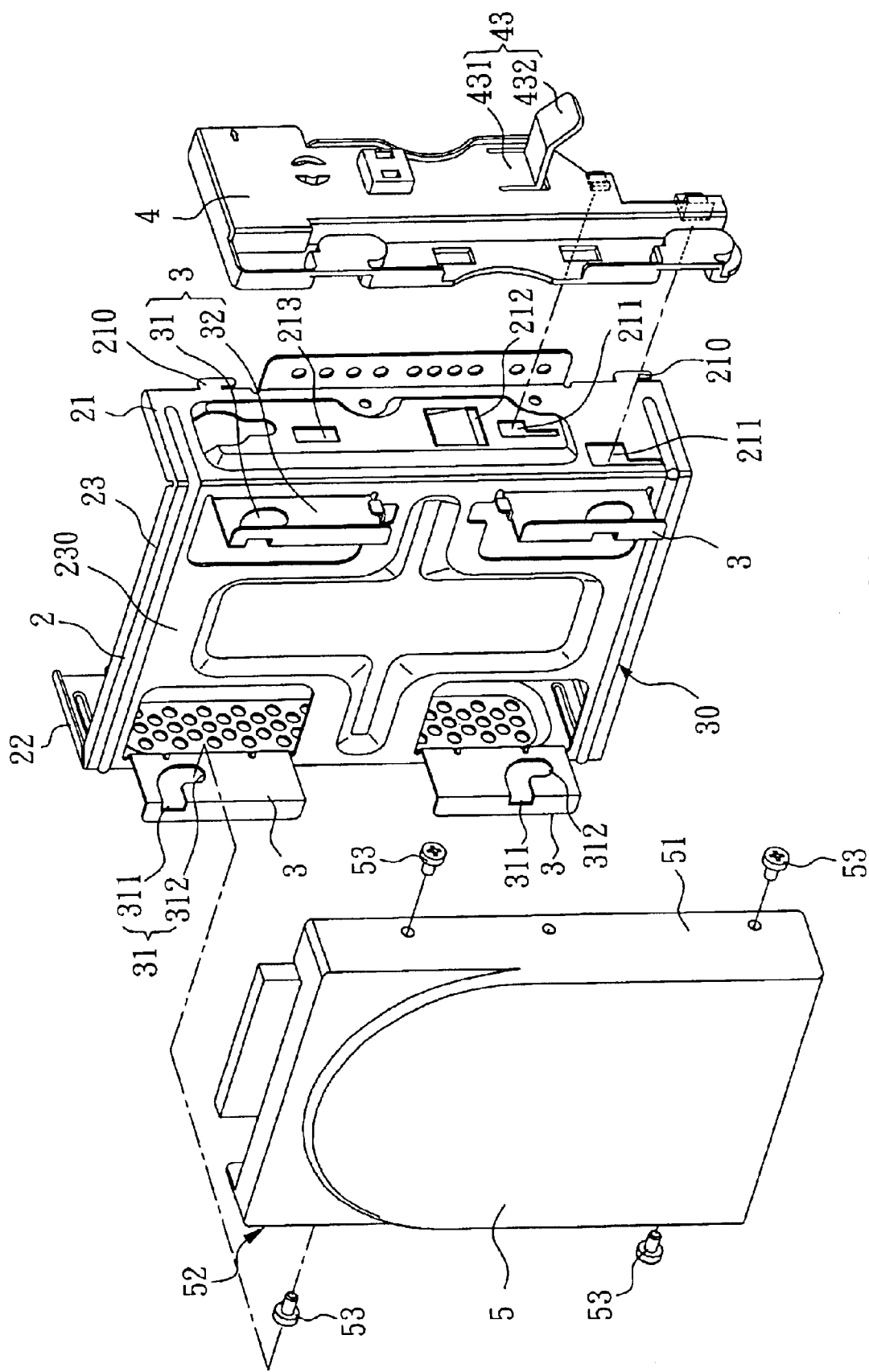
FIG. 3A is an exploded view of the present invention.

Referring to FIG. 2, which is a perspective view of the present invention, the hard disk latch structure 1 comprises a hard disk base frame 2, a hard disk 5, and a mounting element 4. Referring to FIG. 3A, an exploded view of the present invention, and FIG. 3B, an exploded view of the present invention from another perspective, the hard disk base frame 2 is generally U-shaped in lateral cross-section and includes a first sidewall 21, a second sidewall 22 and a top wall 23. The first sidewall 21 has a first sliding mechanism 211, a first locking mechanism 212 and a first assembling mechanism 213; in this preferred embodiment the first sliding mechanism 211 is a groove, the first locking mechanism 212 is a receiving hole, and the first assembling mechanism 213 is an elongated hole. Further, on the outer surface 230 of the top wall 23 of the hard disk base frame 2 and adjacent to both the sidewalls 21 and 22, a pair of receiving plates 3 is integrally formed and projects perpendicularly out from the top wall 23. The space between the four receiving plates 3 defines a hard disk receptacle 30. Each of the receiving plates 3 includes a sliding groove 31 and an outer sliding surface 32; each sliding groove 31 is composed of an insertion end 311 and a blocking end 312.

Figure 3B:
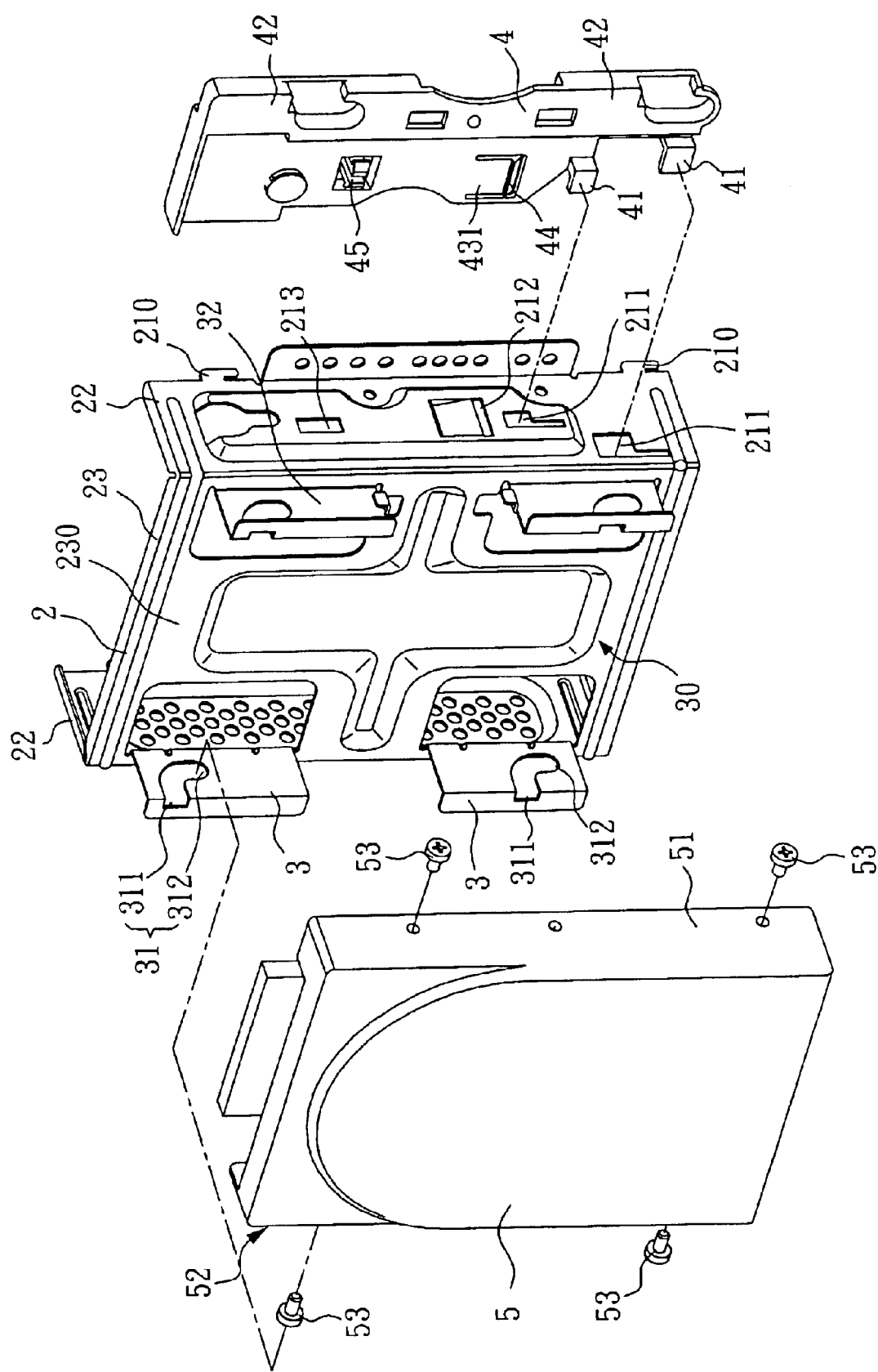
FIG. 3B is an exploded view of the present invention from another perspective.

Referring to FIG. 3A and FIG. 3B, the hard disk 5 has two screws 53 respectively attached to each of the two sidewalls 51 and 52. The mounting element 4, corresponding to the first sidewall 21 of the hard disk base frame 2, includes a second sliding mechanism 41, two blocking objects 42, a handling portion 43 and a second assembling mechanism 45. In this preferred embodiment, the second assembling mechanism 45 is a locking hook set capable of being slidably snap-fit into the first assembling mechanism 213, which is now an elongated hole; the second sliding mechanism 41 is a block erected from the inner surface of the mounting element 4 and generally L-shaped in cross-section, which can fit into and slide along the groove of the first sliding mechanism 211. Those two blocking objects 42 respectively correspond to and support against the outer sliding surfaces 32 of the receiving plates 3 adjacent to the first sidewall 21. Further, the handling portion 43 of the mounting element 4 includes a resilient part 431 and a handle 432. A second locking mechanism 44 is integrally formed on the inner surface of the resilient part 431, corresponding and facing to the first locking mechanism 212 on the first sidewall 21 of the hard disk base frame 2; the second locking mechanism 44 is now a hooking piece.

The assembly of the present invention is illustrated in FIG. 3A, FIG. 3B, FIG. 4A and FIG. 4B. To mount a hard disk 5 within the hard disk receptacle 30 on the hard disk base frame 2, the hard disk 5 is firstly aligned to the receiving plates 3 so that each of the screws 53 thereon respectively corresponds to an insertion end 311 of each of the receiving plates 3. The hard disk 5 is then inserted into the hard disk receptacle 30, and at the same time the screws 53 slide along the sliding grooves 31 to the blocking ends 312 thereof. The handle 432 of the handling portion 43 is held to slide the mounting element 4 along the first sidewall 21 of the hard disk base frame 2 so as to urge each of the blocking objects 42 slide on the outer sliding surface 32 of the corresponding receiving plate 3.

Figure 5A:
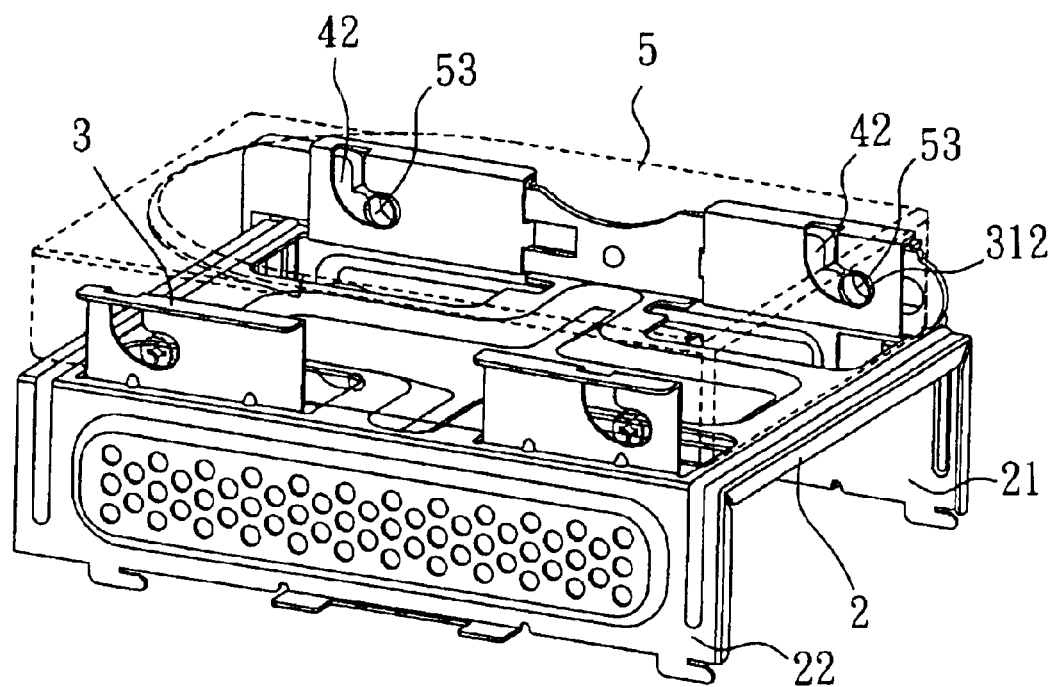
FIG. 5A is a perspective view of the present invention after being assembled.
Figure 5B:
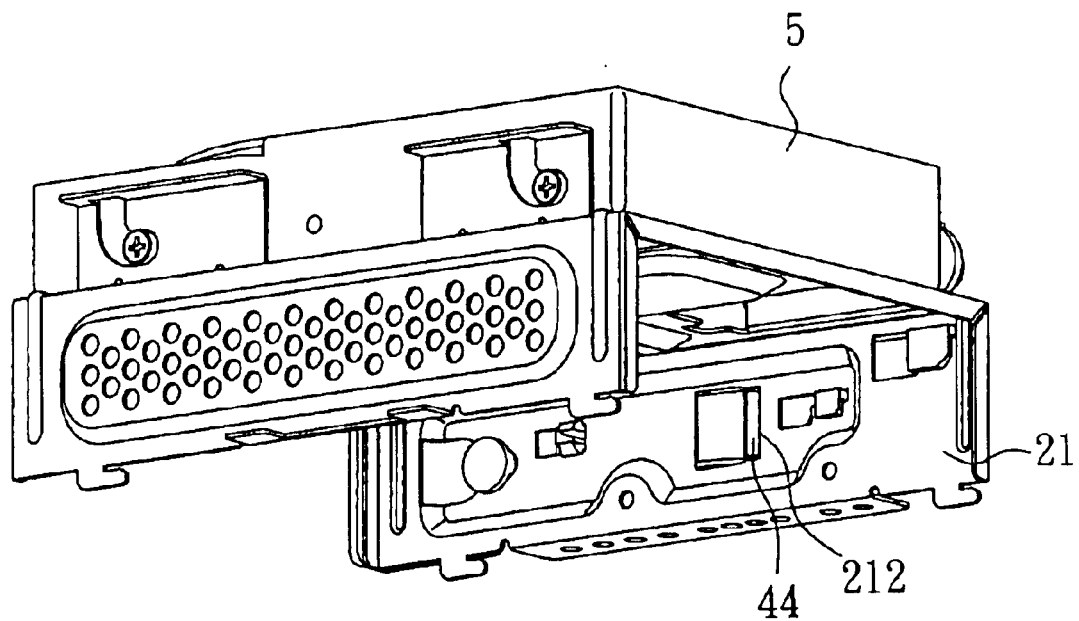
FIG. 5B is a perspective view of the present invention after being assembled from another perspective.

Referring to FIG. 5A and FIG. 5B, the sliding movement between the mounting element 4 and the first sidewall 21 eventually makes the blocking objects 42 lock the screws 53 corresponding to the first sidewall 21 at the blocking ends 312 of the corresponding receiving plates 3. At the same time, the second locking mechanism 44, taking the form of a hooking piece, is resiliently ejected into the first locking mechanism 212, which is now a receiving hole formed on the first sidewall 21, by the resilience of the resilient part 431(as shown in FIG. 3A). This locking mechanism is for preventing the mounting element 4 from falling off the hard disk base frame 2.

Figure 4A:
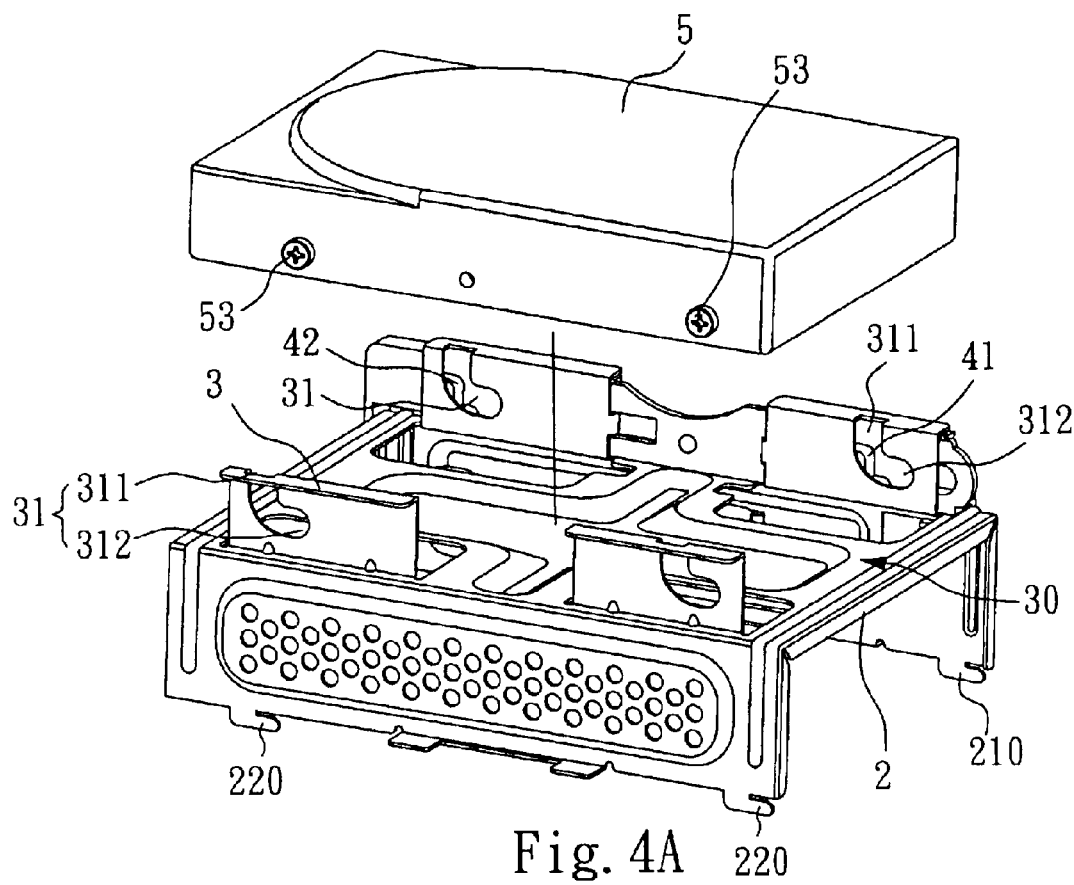
FIG. 4A is a perspective view of the present invention being assembled.
Figure 4B:
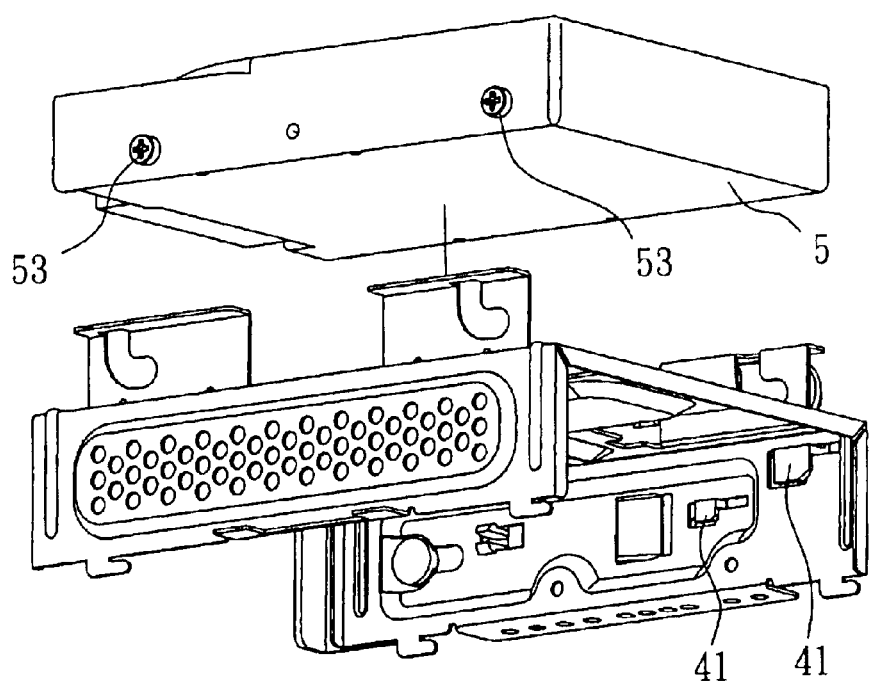
FIG. 4B is a perspective view of the present invention being assembled from another perspective.

Referring to FIG. 1, the assembled structure of the hard disk latch structure 1 is mounted onto the chassis 91 of a computer 9. In the preferred embodiment, a plurality of mounting hooks 210, 220 extending from the first sidewall 21 and the second sidewall 22, as shown in FIG. 4A, which corresponding to hook on a plurality of receiving holes on the chassis 91 of the computer 9 (not shown in the figures). The hard disk latch structure 1 can be straightforwardly mounted onto the chassis 91 by locking the mounting hooks 210, 220 into the corresponding receiving holes.

The above-described hard disk latch structure 1 provides a hard disk latch structure that can be easily installed within or removed from the chassis of a computer. Therefore, it has the advantage of saving operation and maintenance time for disk installing and removing.

Referring to FIG. 1, FIG. 3A and FIG. 3B, to dismount the hard disk 5 from the hard disk base frame 2, just reverse the above mounting procedures. That is, pull the handle 432 so that the second locking mechanism 44 departs from the first locking mechanism 212 by the resilience of the resilient part 431, and then slide the mounting element 4 along the first sidewall 21 of the hard disk base frame 2. The blocking objects 42 of the mounting element 4 simultaneously slide on corresponding receiving plates 3 so that the corresponding screws 53 are locked at the blocking ends 312 no more. The hard disk 5 is then taken from the hard disk receptacle 30 as the screws 53 thereon slide from the blocking ends 312 to the insertion ends 311 and then leave the sliding grooves 31.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hard disk latch structure comprising:

a hard disk base frame being generally U-shaped in lateral cross-section and including a first sidewall, a second sidewall and a top wall, wherein said first sidewall having a first sliding mechanism, a first locking mechanism and a first assembling mechanism, at least two receiving plate each being integrally formed and projecting perpendicularly out from the top wall of said hard disk base frame adjacent to both said first sidewall and said second sidewall respectively, a hard disk receptacle being defined as the space between said receiving plates, each of said receiving plates including a sliding groove and an outer sliding surface, each of said sliding grooves having an insertion end and a blocking end;

a hard disk being received within said hard disk receptacle and having at least one screw mounted on each sidewall thereof, each of said screws respectively corresponding to one said sliding groove and being capable of sliding from said insertion end to said blocking end; and a mounting element corresponding to an outer surface of the first sidewall of said hard disk base frame, said mounting element including a second sliding mechanism, at least one blocking object, a handling portion and a second assembling mechanism, wherein said second assembling mechanism corresponding to said first assembling mechanism and being capable of sliding thereon, said second sliding mechanism corresponding to the first sliding mechanism of said first sidewall and being capable of sliding thereon, said at least one blocking object supporting against the outer sliding surface of the at least two receiving plate adjacent to said first sidewall, said handling portion being composed of a resilient part, a handle, and a second locking mechanism being formed on a corresponding surface of said resilient part facing to said first sidewall, said handle being pulled to facilitate a sliding motion between said mounting element and said hard disk base frame, said at least one blocking object thereby being urged to slide along one of said receiving plates to lock said screws attached to said hard disk at the blocking ends of said sliding grooves, said second locking mechanism accordingly being resiliently ejected into said first locking mechanism.

2. The hard disk latch structure of claim 1, wherein said first sliding mechanism is a groove, and said second sliding mechanism is a block erected from the inner surface of said mounting element, which fits into and slide along said groove.

3. The hard disk latch structure of claim 1, wherein said first locking mechanism is a receiving hole, and said second locking mechanism is a hooking piece capable of being resiliently ejected into said receiving hole.

4. The hard disk latch structure of claim 1, wherein said first assembling mechanism is an elongated hole, and said second assembling mechanism is a locking hook set capable of being slidably snap-fit into said elongated hole.

5. The hard disk latch structure of claim 1, wherein at least one mounting hook extending from said first sidewall or said second sidewall and corresponding to hook on at least one receiving hole on the chassis of a computer.

* * * * *